March 12, 1957   L. SCHWAB ET AL   2,785,057
DEVICE FOR TESTING LIQUIDS
Filed Dec. 8, 1953   2 Sheets-Sheet 1

INVENTOR.
LOUIS SCHWAB,
GEORGE L. O'CONNOR
BY AND FRED W. RIEHLE,

Allen & Allen
ATTORNEYS.

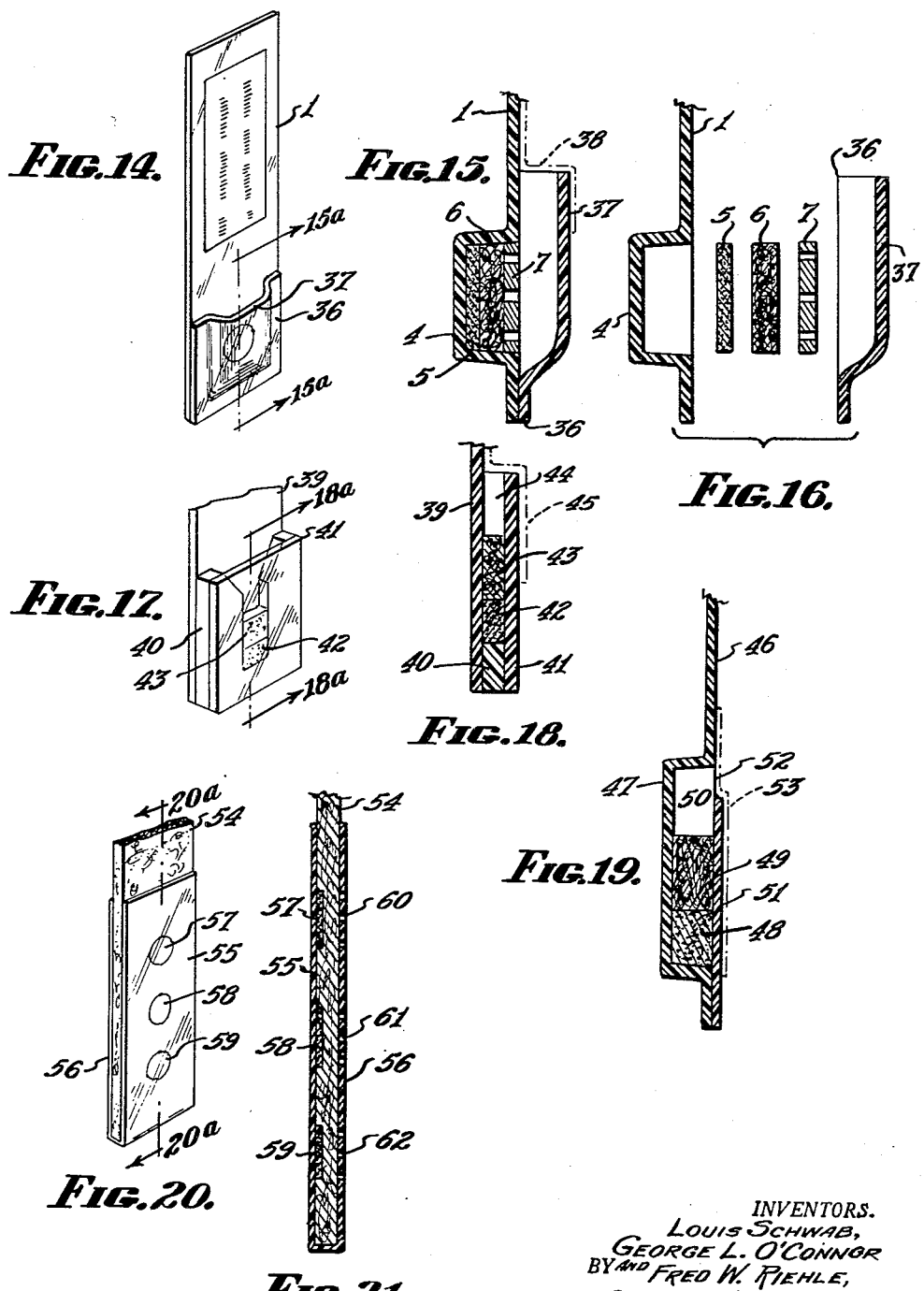

United States Patent Office 2,785,057
Patented Mar. 12, 1957

2,785,057

DEVICE FOR TESTING LIQUIDS

Louis Schwab, George L. O'Connor, and Fred W. Riehle, Cincinnati, Ohio, assignors to The Union Central Life Insurance Company, Cincinnati, Ohio, a corporation of Ohio Application December 8, 1953, Serial No. 396,921

3 Claims. (Cl. 23—253)

Our invention has to do with the performing of rapid tests on liquid substances, the testing being of the type in which the liquid to be tested is brought into contact with a suitable reagent, and the positive or negative character of the test is evidenced by a color change.

A primary object of the invention is to provide a convenient testing device incorporating the reagent, so that the test itself may be performed rapidly and conveniently.

There are numerous tests to which our invention may be applied. As an example, it has long been known that if a water solution containing sugar, glucose or the like is brought into contact with a reagent containing a bismuth compound and an alkaline hydroxide, chemical reduction will take place resulting in the production of an oxide of bismuth and a consequent darkening of the reagent. This is a positive test for relatively very small quantities of sugar or the like in a liquid, and as such it has been recognized as of potential value in indicating the presence of sugar in urine. Thus, while the test is not ordinarily quantitative, it can be employed to determine whether the possibility of diabetes exists to the extent of making quantitative analysis advisable.

In performing such a test several disadvantages are encountered. For one thing, when treating the reagent with the liquid in a suitable vessel conditions may be encountered under which the occurrence of the darkening or color change is difficult to detect. For another, the reagent is subject to deterioration due to the effects of moisture, gases in the atmosphere, and the like so that it has not been possible to regard the test as definitive unless special precautions are taken.

It is an object of this invention to provide a testing device including the reagent, which is not subject to these disadvantages. Specifically, it is an object of our invention to provide a testing device, designed for one-time use, having means for bringing the liquid to be tested into association with the reagent in such fashion that the color change, if any, will be clearly and definitely apparent. Specifically, it is an object of the invention to provide a testing device which incorporates the reagent, but in which the reagent is adequately protected from external influences tending to produce deterioration.

It is also an object of our invention to provide a simple and foolproof device which can be employed by persons who lack technical training. By way of example, we have found it possible in the practice of our invention, in the exemplary embodiment to which reference has been made above, to provide a testing device which may be employed by any individual to indicate the presence or absence of sugar in his urine, and hence to indicate whether he stands in need of a medical examination to determine the likelihood of diabetes. Thus, our devices may be furnished by insurance companies to their policy holders or by doctors to their patients for purposes of a periodic check.

It is also an object of our invention to provide a testing device having the above mentioned functions and advantages which is designed also to include instructions for the use of the device and where desired advertising material such, for example, as the name of an insurance company.

These and other objects of the invention which will be set forth hereinafter or will be apparent to one skilled in the art upon reading these specifications, we accomplish by that construction and arrangement of parts of which we shall now describe certain exemplary embodiments. It will be understood that, while we shall describe our invention in connection with a device for testing urine for the presence of sugars, the broader aspects of our invention are not so limited. The skilled worker in the art will understand that the nature of the reagent may be widely varied for the performance of many different types of tests on liquids while retaining the advantages of the constructions herein outlined.

Reference is made to the accompanying drawings wherein:

Figure 14 is a perspective view of a structure embodying a reservoir.

Figure 15 is a transverse sectional view thereof taken along the section line 15a—15a of Figure 14.

Figure 16 is an exploded sectional view thereof.

Figure 17 is a partial perspective view of another form of reservoir structure.

Figure 18 is a partial sectional view taken along the section line 18a—18a of Figure 17.

Figure 19 is a partial sectional view of still another form of reservoir structure.

Figure 20 is a partial perspective view of a modification of our invention adapted for the performance of a plurality of tests.

Figure 21 is a partial sectional view thereof taken along the section line 20a—20a of Figure 20.

Figure 1:
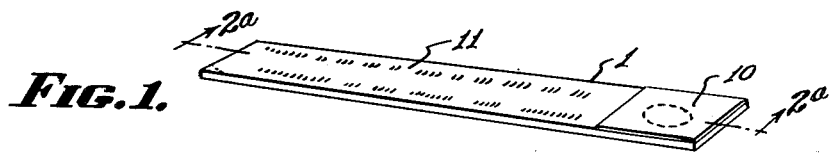
Figure 1 is a perspective view of one form of our device.

Briefly, in the practice of our invention, we provide a testing device having a transparent or translucent wall against which the reagent may be located. The reagent may be in the form of a deposit of powder; but it may also be in the form of a self-sustaining solid mass, as for example, a compressed tablet or the like. The reagent mass is held against the transparent wall by means of a body of absorbent material which serves not only to maintain the position of the reagent but also to conduct to it during the test a suitable quantity of the liquid to be tested so as to insure the uniform and thorough moistening of the reagent therewith, without producing or delivering such an excess quantity of the liquid as would tend in any way to obscure the color change. The absorbent material will in turn be maintained in position by a cover element which is perforated so as to permit access of the liquid to be tested to the absorbent material without loss of the relationship of the parts.

Our invention also contemplates a protective covering serving to shield the reagent from the effects of moisture and atmospheric or other gases.

Our devices may take several forms. In certain of these forms the transparent wall forms the bottom of a well which contains also the reagent and the absorbent material. In other forms of the invention the reagent may essentially be located or embedded in a recess in the absorbent material, being held in place by the transparent wall aforesaid. But in each instance the liquid to be tested reaches the reagent mass through the absorbent material in proper quantity for the test, and the color change is noted by observing the reagent mass through the transparent wall. In some instances it will be found of advantage to locate adjacent the reagent mass a surrounding material or wall of a color substantially that of the regent mass before the test is performed. This aids in the visual determination of the color change in the reagent mass by contrast, as will be readily understood. Furthermore, in the preferred forms of our invention, the device is preferably elongated with the reagent mass localized near one end. The remaining portion of the device thus serves as a convenient manipulating handle so that it becomes easy to apply the liquid to be tested without bringing it or the reagent into contact with the fingers at any time. Further, the handle portion of the device may be utilized for printed instructions or other indicia as desired.

Coming now to certain specific embodiments of the invention, reference is made to Figures 1 to 4 inclusive. Here, we have shown an elongated strip-like element 1 which may be made of plastic or other suitable material. Near one end, the body 1 is molded, drawn or otherwise formed with a well 4. In the practice of our invention it is essential that the bottom wall of this well be transparent or at least so translucent that any color change in the reagent mass which will be located in the well will be clearly apparent to the observer.

Figure 2:
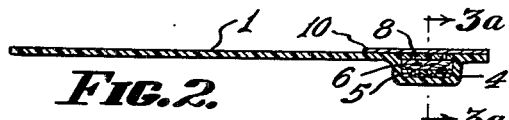
Figure 2 is a longitudinal sectional view thereof taken along the section line 2a—2a of Figure 1.
Figure 4:
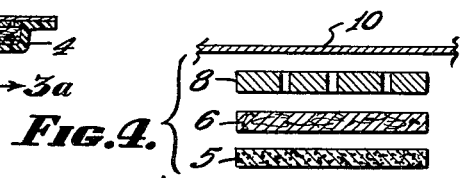
Figure 4 is a partial sectional view related to Figure 3 but showing the parts in exploded relationship.
Figure 3:
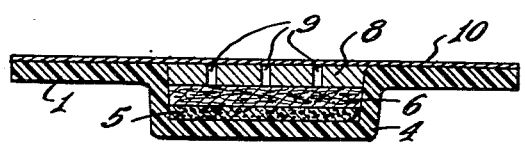
Figure 3 is a transverse sectional view of the same embodiment taken along the section line 3a—3a of Figure 2.
Figure 5:
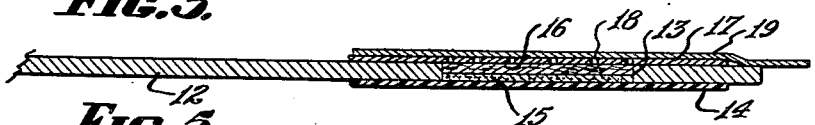
Figure 5 is a partial longitudinal sectional view of another embodiment of our invention.
Figure 6:
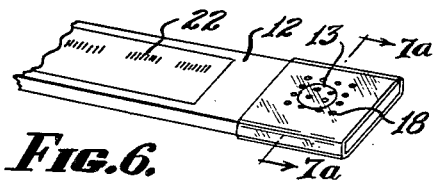
Figure 6 is a partial perspective view thereof.

A reagent mass is indicated in Figures 2 to 4 by the index numeral 5, and it may be either a mass of powdered reagent deposited in the well or a preformed tablet or the like placed therein against the well bottom.

The material of the reagent will, of course, vary with the nature of the test to be performed and, excepting as otherwise set forth in the appended claims, does not constitute a limitation on the invention. By way of example, if a test were to be made of the alkalinity or basicity of a solution, the so-called reagent might well be an inert powder stained with a suitable indicator such as phenolphthalein, methyl orange or the like. In testing a solution for starch, an inert powder or a piece of felted material stained with iodine may be employed. These possibilities are mentioned to indicate that by the term reagent we contemplate any material, with or without a support, which is adapted to undergo a color change in the useful testing of a liquid.

In the exemplary embodiment of the invention where the purpose is to test for sugar in the urine, the reagent will normally be a bismuth compound such as bismuth subnitrate, bismuth oxychloride, or bismuth subcarbonate mixed with an alkaline hydroxide such as sodium hydroxide, these materials being anhydrous. It is well known that such a mixture decomposes slowly in the presence of air and moisture. It has been suggested that the addition of other materials such as silicates, magnesium compounds, lead compounds and the like will improve the stability of the material. Even so, slow changes occur even where the material is stored in ordinary closed containers. In our invention special precautions may be taken as hereinafter outlined to preserve the reagent from deleterious influences.

Above the reagent mass 5 in Figures 2 to 4 we locate a mass of absorbent material 6. This may be a soft mass of absorbent cotton or the like, but where the base 1 is formed with a circular well as shown, it will be found convenient to employ a disk stamped or otherwise formed from chemically clean blotting paper, cellulose wadding or the like. The absorbent material is held in place by a disk 8 of intert material (which may well be the same as the material of the body 1). This disk will be perforated as at 9 to permit access to the absorbent material of the liquid to be tested.

The absorbent material conducts the liquid to the reagent mass 5 in such fashion that this mass becomes saturated or permeated therewith. At the same time such an excess of the liquid as would produce displacement of the reagent or render the color change difficult to see is prevented. The color change, if it occurs, is readily and definitely apparent through the transparent wall.

In order to prevent access of air, moisture or other gases to the reagent and the absorbent material, the disk 8 and adjacent portions of the body 1 may be covered with a strip or sheet 10 of impermeable, flexible material such for example as moisture-proof cellophane, cellulose acetate, metal foil or the like, preferably held in place by an impermeable pressure-sensitive adhesive. When the test is to be performed, this strip or sheet is first removed, after which it is necessary only to bring the liquid to be tested into contact with the disk 8, so that the liquid may pass through the perforations 9 and saturate the absorbent material 6. The handle portion of the body 1 may bear indicia 11 constituting directions for performing the test or other information.

Modified forms of our structure are shown in Figures 5 to 9 inclusive. Here a flat strip of stiff material forms the body 12. It may be provided with a perforation 13 of substantial size and any convenient shape. To one side of the body 12 there is attached an imperforate sheet 14 of plastic or the like to constitute a transparent wall covering one end of the perforation. The reagent 15 is located against this wall and is surmounted by a disk or body of absorbent material 16. A sheet 17 of suitable material is affixed to the opposite side of the body 12 to hold the parts in assembly; and this sheet is perforated as at 18 to permit access to the absorbent material by a liquid to be tested. A removable, impervious cover sheet 19 may be placed over the sheet 17, being adhesively held in place in such fashion that it can be stripped away when a test is to be made.

Figure 7:
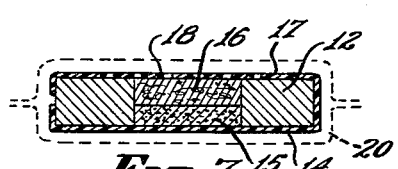
Figure 7 is a transverse section taken along the section line 7a—7a of Figure 6.
Figure 8:
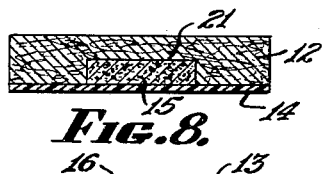
Figures 8 and 9 are respectively transverse sectional views showing modifications of the structure of Figure 7.
Figure 9:
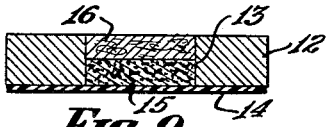

If the body 12 and the sheets 14, 17 and 19 are of impervious material it is evident that in this construction the reagent 15 will be adequately protected from external influences. The transparent wall 14 and the member 17 may be integral parts of a single strip of material bent over the edges of the body as most clearly illustrated in Figure 7. If the body 12 is made of a material which is porous, such as for example paperboard, as distinguished from an imprevious material, such as for example a plastic, the body itself may be caused to conduct a liquid to be tested to the reagent or to the absorbent material 16. In this event, however, the body will not serve to protect the reagent from moisture and deleterious gases, and additional protection is desirable. One way in which such protection may be afforded is by enclosing the entire device in a sealed envelope of impervious material such as polyethylene or other plastic, or foil or the like. Such an envelope is indicated in Figure 7 in dotted lines at 20.

Where the body 12 is of absorbent or permeable material the construction may be simplified. Thus in Figure 8 we have shown the body recessed as at 21 to receive the reagent 15, the transparent wall 14 serving to hold the reagent in place. The recessing may be done by cutting or stamping in the sense of compressing a portion of the body 12. In Figure 9, the body 12 has been perforated as at 13. The reagent 15 being placed in the perforation and retained in position by the transparent wall 14 on one side and a disk 16 inserted in the other end of the perforation and having sufficient stiffness to act as a retainer. The disk 16 may be of absorbent material, but it may be of other material if the body 12 is absorbent. The modifications of Figures 8 and 9 are preferably enclosed in a protective envelope or covering such as has been referred to above. The body 12 may bear indicia as indicated at 22 in Figure 6.

Figure 10:
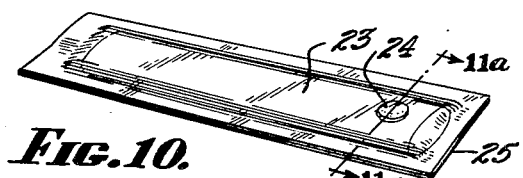
Figure 10 is a perspective view of yet another embodiment of our invention.
Figure 11:
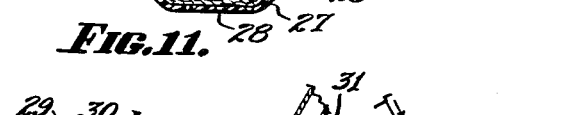
Figure 11 is a transverse sectional view thereof taken along the section line 11a—11a of Figure 10.

Another form of our device is illustrated in Figures 10 and 11. Here we employ a body 23 of absorbent material which need not be stiff. It may indeed be of the nature of a surgical packing. A tablet 24 of the reagent is located with respect to the absorbent material, preferably near one end of it, and preferably by means of a recess formed in the absorbent material by compressing it as most clearly shown in Figure 11.

These elements are next enclosed in a relatively tightly fitted envelope 25. This envelope may be formed in various ways. It is shown as formed from two sheets adhered together about their edges. The upper sheet 26 at least is transparent so that any color change in the reagent may be viewed through it. The lower sheet 27 need not be transparent but in any event will be perforated as at 28 to permit the liquid to be tested to reach the absorbent material 23. If the sheets 26 and 27 are of impervious material, the reagent may be protected merely by affixing a removable, impervious cover sheet over the perforated portion of the sheet 27. If the sheets 26 and 27, or either of them, are not impervious then the entire device is preferably enclosed in a sealed impervious envelope as above described.

Structures such as illustrated in Figures 10 and 11 lend themselves to continuous processes of manufacture. Where an impervious outer envelope is to be employed it is possible to use the absorbent material 23 as well as the sheets 26 and 27 in the form of continuous strips and, after assembly simply cut the product into individual lengths. In this event the absorbent material 23 will not be entirely enclosed in the envelope 25 but will be exposed at the ends thereof. Protection will be afforded, however, by the outer envelope.

Figure 12:
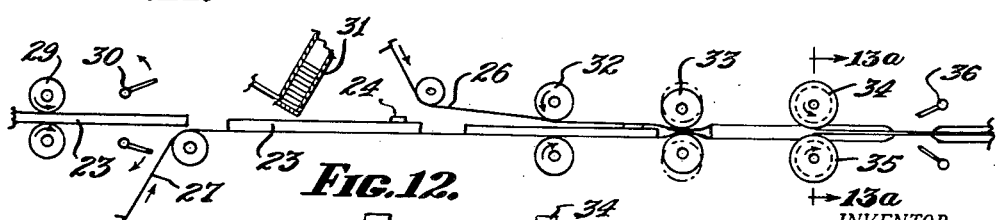
Figure 12 is a diagrammatic representation of apparatus which may be employed in making the structure of Figures 10 and 11.
Figure 13:
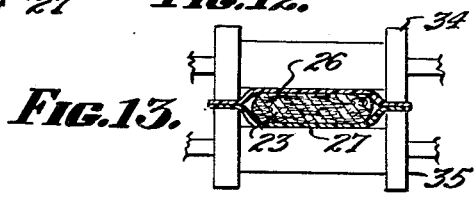
Figure 13 is a transverse sectional view taken along the section line 13a—13a of Figure 12.

Enclosed structures such as shown in Figure 10 may be made as diagrammatically illustrated in Figures 12 and 13. Here the absorbent material 23 is fed forwardly from a supply by pinch rolls indicated at 29. These pinch rolls may be so configured as to form recesses at suitable intervals in the absorbent material for the reception of the reagent tablets. A timed fly knife arrangement 30 may be employed to cut the absorbent material into suitable lengths, these lengths being deposited at spaced intervals on a traveling supply of the under sheet substance 27. This supply may be pre-perforated at suitable intervals to provide the access openings 28 (Figure 11), or perforating means may be included in the apparatus assembly being described.

A suitable mechanism 31 is employed to deposit the reagent tablets 24 in the proper positions on the pieces of absorbent material. A strip of the upper sheet substance is led onto the top of the assembly which is fed forward by pinch rolls 32. The strips of sheet substance 26 and 27 are preferably covered with a pressure sensitive impervious adhesive; but is is also possible to employ heat sealable materials and effect the transverse and longitudinal seals by members adapted to exert both heat and pressure.

A mechanism 33 such as a pair of rolls either resiliently or eccentrically mounted produces the transverse seals as shown between the spaced pieces of absorbent material 23. Flanged pressure or heat sealing rolls 34 and 35 most clearly shown in Figure 13 effect the longitudinal seals. The material is cut apart into individual units in the areas of the transverse seals by suitable mechanism such as a fly knife arrangement 36.

If the units are to be enclosed in sealed envelopes this may also be accomplished by continuous mechanism similar to that shown, utilizing for example upper and lower strips of polyethylene brought together about the individual units and heat sealed transversely and longitudinally. In order to afford more perfect protection to the reagent any envelope or package in which our devices are enclosed may be filled with an inert gas, or the entire packaging operation can be carried on in an atmosphere of inert gas.

It has been our purpose to devise structures which do not require complicated operations on the part of the user. By way of example, it is for this reason that we prefer to employ a pre-perforated retainer for the absorbent material in the structures thus far described. It is possible to simplify the construction in some instances by omitting these perforations. Thus, in the structures of Figures 10 and 11 the perforations 28 may be omitted in which event, assuming the envelope 25 to be tight, an outer sealed envelope can be obviated. However, this means that the user will have to provide the perforations 28 which he can easily do with a pin or needle.

In the use of our structures it is necessary to insure that a sufficient quantity of the liquid to be tested will be brought into contact with the absorbent material for a sufficient length of time. In normal use the ends of our structures will be dipped into the liquid to be tested in some suitable vessel; but the proper performance of the test will normally require a timing operation. It is possible to do away with this by providing in connection with our testing device a reservoir element which, without timing, will serve to retain a sufficient quantity of the test liquid in contact with the absorbent material.

One such structure is illustrated in Figures 14, 15 and 16. Here we have shown a body 1 like that of Figure 1, having the well 4 containing the reagent 5, absorbent material 6 and perforated retainer 7. A reservoir forming member 36 having a deflected portion 37 is conveniently formed as a separate piece of plastic. This member has coplanar marginal portions on three sides, and these marginal portions are cemented or fused to the body 1 so that the element 36 forms an open ended reservoir as shown, overlying the well.

In the use of this device it is necessary only to dip it into the test fluid. The reservoir immediately fills, whereupon the test device may be withdrawn and the color change observed as it occurs. It is possible under some circumstances to seal this construction by the use of a cemented sheet shown at 38 in Figure 15 in dotted lines. It will usually be found preferable, however, to enclose the structure in a sealed envelope.

Another type of reservoir structure is shown in Figures 17 and 18. Here the body 39 is shown as having joined to it at one end a substantially U-shaped member 40 surmounted by a transparent wall member 41. This structure may be made integral in a molding operation, but is more cheaply produced by forming the parts 39, 40 and 41 separately and joining them together in the assembly shown by fusion or the use of a suitable adhesive. In this construction the reagent 42 is located inside the U-shaped member and is held in place by a superposed body 43 of absorbent material. The dimensions of these elements are so chosen that the interior portion of the U-shaped member 40 is not filled thereby. Thus, the upper portions of the legs of the U-shaped member together with portions of elements 39 and 41 define a reservoir indicated at 44 serving the purpose described above. Here again a seal may be effected by a cover element 45 or the entire structure may be enclosed in a sealed, impervious envelope. The color change in the reagent 42 may be observed either through the element 39 or the element 41 depending upon whether one or both of these elements is made transparent in the sense in which that term is used herein.

Yet another type of reservoir device is illustrated in Figure 19. Here the main body 46 is stamped, molded or otherwise configured to provide a well 47. This well is preferably longitudinally elongated so that it can hold the reagent body 48 and an absorbent mass 49 which taken together do not entirely fill the well so that a reservoir space 50 is provided above them. A cover element 51 is affixed to the base 46 peripherally on three sides but is so chosen in its dimensions as to fall short of closing the reservoir space 50, leaving an access opening at 52. This device may be dipped into the test liquid which will be caused to fill the reservoir 50 in sufficient quantity for the purposes of the test. This structure may be more readily sealed by a cover sheet 53, but an external sealed envelope may likewise be employed.

In some instances it will be found desirable to perform a plurality of tests either sequentially or simultaneously. Our structures lend themselves to such operations. In Figures 20 and 21 we have shown a structure analogous to that illustrated in Figure 8. It comprises an absorbent base or body 54 having on one side of it a transparent wall 55 and on the other side a retaining wall 56. Three reagent masses 57, 58 and 59 have been shown positioned at spaced intervals against the transparent wall member. The retaining wall member 56 is perforated as at 60, 61 and 62 at suitable positions in relation to the reagent masses.

A structure such as that shown in Figures 20 and 21 is useful for various purposes. For example, a quantitative test for sugar in the urine may be arranged by varying the reagent in the masses 57, 58 and 59 in such fashion that a quantitative indication will be given by the relative darkening or failure to darken of different masses of the reagent. The color of the body 54 will readily serve as an index for comparison. Likewise, the reagent masses 57, 58 and 59 may be of different substances designed for the performance of different tests. Thus, in a device for urinalysis one of the reagent masses may be designed to test for sugar or glucose, another for albumin, yet another for acetone and the like.

While we have described a multiple test device only in connection with the type of structure shown in Figure 8, it will be readily apparent to the skilled worker in the art that any of the structures herein illustrated may be made up in the form of multiple testing devices.

Modifications may be made in our invention without departing from the spirit of it. Having thus described our invention in certain exemplary embodiments, what we claim as new and desire to secure by Letters Patent is:

1. In a testing device of the character described, an elongated relatively flat body member terminating at one end in a testing portion, the remainder of said body comprising a handle by means of which said testing portion may be brought into contact with a liquid to be tested, said testing portion including a reservoir for a liquid to be tested, a reagent body located within said reservoir and retained therein by a mass of absorbent material, said testing portion including a transparent wall, with said reagent body located against said transparent wall.

2. In a testing device of the character described, an elongated body element having a handle portion and an operating portion including a transparent wall, a reagent body located against said wall, and means including a body of absorbent material confining said reagent body against said transparent wall and serving to conduct a liquid to be tested to said reagent body, whereby a change in the appearance of said reagent body produced by said liquid is observable through said transparent wall, said operating portion including a reservoir in communication with said absorbent material, whereby a predetermined quantity of liquid to be tested may be maintained in contact with said absorbent material; and a removable cover member covering said reservoir, said cover member being adapted to be removed when it is desired to use said testing device.

3. A testing device for liquids comprising an elongated flat transparent body having an integrally formed well at one end thereof displaced from the plane of said flat body, a reagent body located within said well and against its bottom, means including a body of absorbent material located in said well and above said reagent body for confining said reagent body against the bottom of said well and serving to conduct a liquid to be tested to said reagent body, the remainder of said body comprising a handle by means of which the well end of said body may be brought into contact with a liquid to be tested, whereupon the device may be removed from the liquid and a change in the appearance of the reagent body produced by the liquid observed through the transparent bottom of the well, and a reservoir in communication with said body of absorbent material, whereby a predetermined quantity of a liquid to be tested may be maintained in contact with said absorbent material.

References Cited in the file of this patent

UNITED STATES PATENTS

| | | |
|---|---|---|
| 1,535,536 | MacDonald | Apr. 28, 1925 |
| 1,826,115 | Ziebarth | Oct. 6, 1931 |
| 2,249,867 | Snelling | July 22, 1941 |
| 2,567,445 | Parker | Sept. 11, 1951 |
| 2,601,840 | Smith | July 1, 1952 |

FOREIGN PATENTS

| | | |
|---|---|---|
| 473,720 | France | Jan. 22, 1915 |
| 883,659 | France | Mar. 29, 1943 |